L. F. BIESMEYER.
CRANK AND LEVER MECHANISM FOR VEGETABLE CUTTERS.
APPLICATION FILED APR. 1, 1914.
1,119,792.
Patented Dec. 8, 1914.
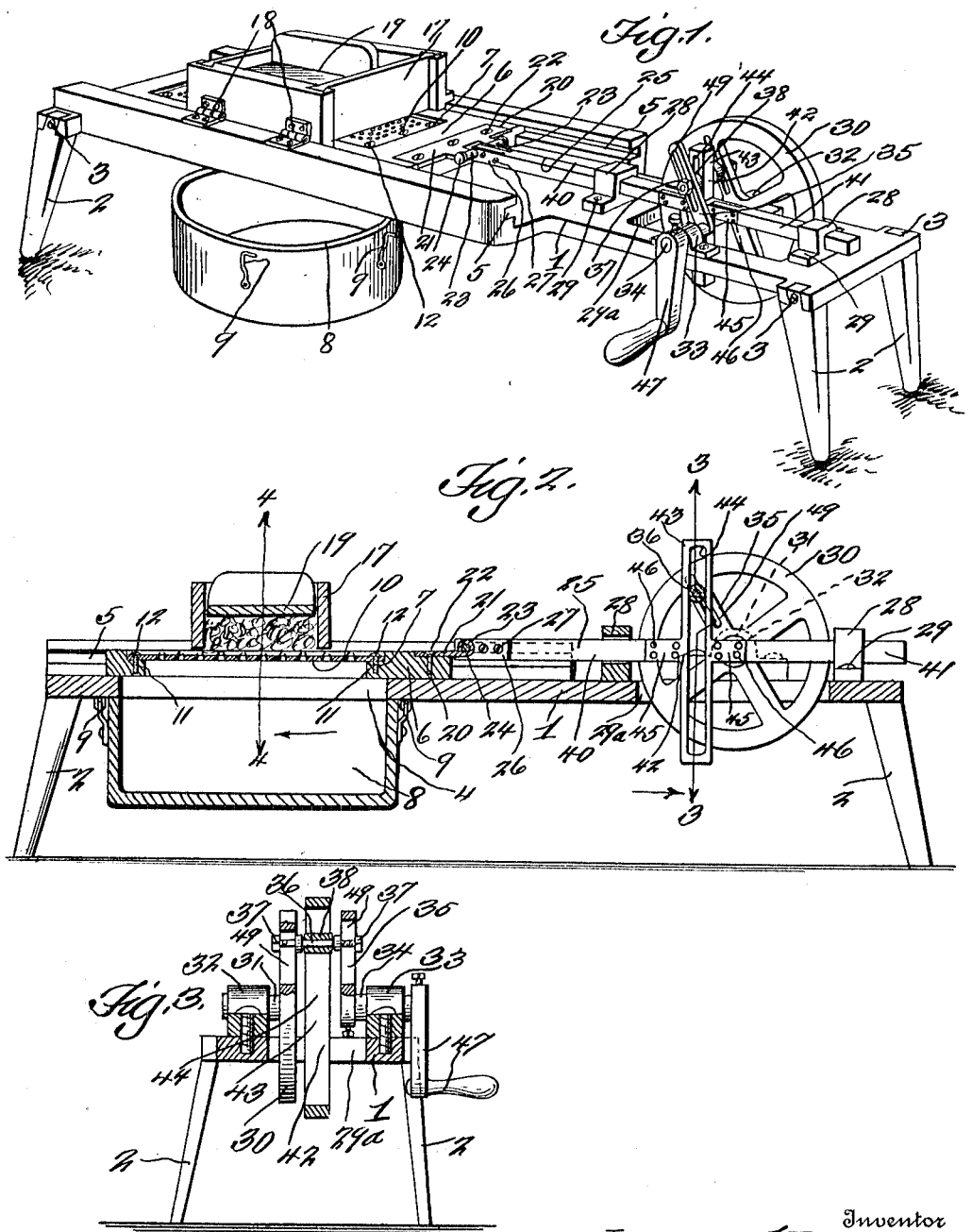
Witnesses
A. R. Wolfe
Francis G. Brawell
Inventor
Lorenz F. Biesmeyer,
By D. Swift & Co.,
his Attorneys

UNITED STATES PATENT OFFICE.

LORENZ F. BIESMEYER, OF BONNOTS MILL, MISSOURI.

CRANK AND LEVER MECHANISM FOR VEGETABLE-CUTTERS.

1,119,792. Specification of Letters Patent. Patented Dec. 8, 1914.

Application filed April 1, 1914. Serial No. 828,748.

*To all whom it may concern:*

Be it known that I, LORENZ F. BIESMEYER, a citizen of the United States, residing at Bonnots Mill, in the county of Osage and State of Missouri, have invented a new and useful Crank and Lever Mechanism for Vegetable-Cutters; and I do hereby declare the following to be a full, clear, and exact description of the invention, such as will enable others skilled in the art to which it appertains to make and use the same.

This invention relates to the art of cutters and slicers, and particularly to an improved fruit and vegetable cutter, and the object of the same is to provide a device of this nature especially adapted for cutting sauerkraut and grating potatoes. To accomplish the grating of potatoes and cutting kraut, interchangeable sliding cutters are provided.

Another object of the invention is the provision of a device of this design, which is simple and practical in construction, and can be sold for a nominal price, and can be conveniently changed from a kraut cutter to a potato cutter, and vice versa, by interchanging the cutting slides.

In practical fields the details of construction may be subjected to alterations falling within the scope of what is claimed.

The invention comprises further features and combination of parts, as hereinafter set forth, shown in the drawings and claimed.

In the drawings:—Figure 1 is a view in perspective of the improved cutter constructed in accordance with the invention. Fig. 2 is a longitudinal sectional view. Fig. 3 is a transverse sectional view on line 3—3 of Fig. 2.

Referring more particularly to the drawings, 1 designates an elongated bed plate, detachably mounted upon suitable supporting legs 2, detachably or foldably connected at 3. One end portion of the bed plate is provided with a suitable elongated opening 4, and rising from the opposite longitudinal edges of the bed plate are elongated guide grooves 5, in which the slide 6 is mounted to reciprocate. This slide is provided with a flanged opening 7, and is designed to reciprocate over the opening 4 of the bed plate, through which the fruit or vegetable after being sliced or grated pass into the receptacle 8. This receptacle may rest upon the surface below the machine, or it may be detachably hooked or fastened under the machine as shown at 9, by any suitable means. This receptacle may be any suitable form, for instance a tub, keg, or dish pan or the like, to receive the kraut, fruit or vegetables after being cut, grated or sliced, for packing purposes or storage. This receptacle preferably has vertical sides. The flanged opening 7 is designed to receive any form of cutting, grating or mincing knife 10, as shown in Figs. 4 and 5, each of said knives being secured to the flange 11 of the opening 7, by means of suitable screws or the like 12. The knife or plate shown in Fig. 4 is constructed with a pair of cutting blades 13 and 14, and the openings 15, through which the cabbage or kraut passes after being cut. The cutting blades 13 and 14 are disposed so that their cutting edges face one another, so that upon each stroke of the knife 10 and the slide 6, the kraut, fruit, or vegetables or the like are shaved, cut, grated or sliced. Any form of knife, blade or plate may be secured in the flanged opening.

A suitable hopper 17 is hinged at 18 to one of the guide flanges of the bed plate. The hopper is designed for the purpose of receiving that which is to be cut, grated or sliced, there being a follower plate, press plate or plunger 19, for pressing that which is to be cut or sliced against the cutting or grating knives or plates, so as to insure the cutting knives always contacting with the fruit or vegetables, as the same is reciprocated.

One end of the slide has a recess 20 to receive a plate 21, which is secured in place by the screws 22. This plate 21 is constructed with a pair of rolls 23, to receive a pin 24, which also passes through one end of the reciprocating plunger 25, there being bearing plates 26, secured by screws 27 to the plunger. This plunger operates in a pair of guides or members 28, which are secured at 29 to the bed plate. Between the guides 28, the bed plate is constructed with an opening 29ª, in which the fly wheel 30 rotates. This fly wheel is mounted upon a stub shaft 31, which is mounted in a bearing 32. Mounted in a bearing 33 is a stub shaft 34 having a crank arm 35 provided with a pin 36. This pin 36 is secured to the crank arm and the fly wheel by means of the nut 37, and on the pin is a sleeve 38. The plunger bar consists of two sections 40 and 41 provided with a connecting casting 42. This casting 42 is constructed with a vertical portion 43 having an elongated vertical slot 44, in which the sleeve 38 operates. Projecting laterally from each side of the vertical portion 43 of the casting are the extension plates 45. These extension plates 45 are connected by screws 46 to the sections 40 and 41 of the plunger. One end of the stub shaft 34 has a crank handle 47, whereby a revoluble movement may be imparted to the stub shaft and the crank arm and fly wheel. As the crank arm rotates the pin and the sleeve traveling vertically in the slot of the portion 43 of the casting of the plunger, a reciprocating movement is imparted to the plunger, and thence to the slide, and as the slide travels backwardly and forwardly the cutting blades or knives, cut, slice or mince, or otherwise grate the vegetables or the like.

The crank arm 35 and the fly wheel are provided with oppositely arranged slots 49, in which the pin 36 is adjustable radially from the center of the stub shafts. When the pin 36 is adjusted nearer the stub shaft, the peripheral movement of the pin is smaller. In other words, the arc on which the pin travels is smaller, and the reciprocating movement of the plunger is shorter, and therefore quicker or more rapid. If the pin is adjusted outwardly from the stub shafts, then the arc on which the pin moves is increased, and the reciprocating movement of the plunger is correspondingly increased. This change in the movement of the plunger may be essentially necessary in cutting certain vegetables or fruit. For instance, in grating skins of fruit or potatoes or the like a short reciprocating movement is better adapted, but when cutting kraut or cabbage or the like a long reciprocating movement is more desirable, in that the cabbage or kraut should be cut in long strips.

The invention having been set forth, what is claimed as new and useful is:—

1. In a vegetable cutter, a reciprocating element having a transverse portion provided with a correspondingly disposed slot, an operating mechanism comprising a revoluble element having a radial slot, a crank element having a slot substantially corresponding in radius with and in registration with the slot of the revoluble element, a pin adjustable in the slots of the crank element and the revoluble element radially with relation to the axis of both elements, and a roller on said pin operating in the transverse slot of the reciprocating element.

2. In combination, a supporting frame, a reciprocatory element mounted in guides of said frame and having a transverse portion provided with a correspondingly extending slot, an operating mechanism for said reciprocatory element comprising a revoluble element having a radial slot, means for mounting said revoluble element on said frame, a manually manipulated revoluble device including a shaft mounted in bearings of said frame, a cranking element on said shaft having a slot substantially corresponding in radius with and in registration with the slot of the revoluble element, a pin mounted in the slots of the cranking element and the revoluble element, means coöperating on each side of the revoluble element for adjusting the pin, means coöperating on each side of the cranking element for permitting the pin to be adjusted, and an anti-frictional device loosely mounted on the central portion of the pin and coöperating with the transverse slot of the reciprocatory element.

In testimony whereof I have signed by name to this specification in the presence of two subscribing witnesses.

LORENZ F. BIESMEYER.

Witnesses:
J. F. SCHAFFER,
R. B. GREEN.

Copies of this patent may be obtained for five cents each, by addressing the "Commissioner of Patents, Washington, D. C."